(12) United States Patent
Chen et al.

(10) Patent No.: US 11,362,818 B2
(45) Date of Patent: Jun. 14, 2022

(54) METHOD FOR ISSUING QUANTUM KEY CHIP, APPLICATION METHOD, ISSUING PLATFORM AND SYSTEM

(71) Applicant: QUANTUMCTEK (GUANGDONG) CO., LTD., Guangdong (CN)

(72) Inventors: Qing Chen, Guangdong (CN); Xiang Xiao, Guangdong (CN); Jiayi Lin, Guangdong (CN); Songyan Ding, Guangdong (CN); Jierong Chen, Guangdong (CN)

(73) Assignee: QUANTUMCTEK (GUANGDONG) CO., LTD., Guangdong (CN)

( * ) Notice: Subject to any disclaimer, the term of this patent is extended or adjusted under 35 U.S.C. 154(b) by 417 days.

(21) Appl. No.: 16/464,579

(22) PCT Filed: Nov. 22, 2017

(86) PCT No.: PCT/CN2017/112256
§ 371 (c)(1),
(2) Date: May 28, 2019

(87) PCT Pub. No.: WO2018/095322
PCT Pub. Date: May 31, 2018

(65) Prior Publication Data
US 2021/0067331 A1    Mar. 4, 2021

(30) Foreign Application Priority Data
Nov. 28, 2016 (CN) .......................... 201611070527.7

(51) Int. Cl.
*H04L 9/08* (2006.01)
*H04L 12/46* (2006.01)

(52) U.S. Cl.
CPC .......... *H04L 9/0852* (2013.01); *H04L 9/0869* (2013.01); *H04L 12/4641* (2013.01)

(58) Field of Classification Search
CPC .. H04L 9/0852; H04L 9/0869; H04L 12/4641
(Continued)

(56) References Cited

U.S. PATENT DOCUMENTS 8,041,039 B2 * 10/2011 Tajima .................. H04L 9/0855
380/279
9,350,708 B2 * 5/2016 Wong .................. H04L 63/0428
(Continued)

FOREIGN PATENT DOCUMENTS

CN         201830272 U      5/2011
CN         105357001 A      2/2016
(Continued)

OTHER PUBLICATIONS

International Search Report and Written Opinion from PCT/CN2017/112256, dated Jan. 26, 2018.
(Continued)

*Primary Examiner* — Dereena T Cattungal
(74) *Attorney, Agent, or Firm* — Merchant & Gould P.C.

(57) ABSTRACT

A method for issuing a quantum key chip, a method for applying a quantum key chip, an issuing platform and a system. The method comprises: feeding, by a a quantum key issuing platform, a quantum key into a quantum key chip and binding an ID of the quantum key chip in a one-to-one correspondence to an ID of a user using the quantum key chip, where the ID of the quantum key chip and/or the ID of the user serve as identification information of the quantum key in the quantum key chip, and the quantum key is obtained by pre-negotiation between the quantum key issuing platform and a key distribution center (KDC); and sending, by the quantum key issuing platform, the identification information of the quantum key to the KDC, so that the KDC binds the identification information to the quantum key corresponding to the identification information.

10 Claims, 5 Drawing Sheets

(58) Field of Classification Search
USPC .......................................................... 380/278
See application file for complete search history.

(56) References Cited

U.S. PATENT DOCUMENTS

| | | | | |
|---|---|---|---|---|
| 9,781,081 B1* | 10/2017 | Wasiq | ................... | H04L 63/166 |
| 2008/0052577 A1* | 2/2008 | Tanaka | ................... | H04L 9/0838 714/728 |
| 2008/0298583 A1* | 12/2008 | Ahmed | ................... | H04L 9/12 380/46 |
| 2011/0166999 A1 | 7/2011 | Tushie et al. | | |
| 2013/0051559 A1* | 2/2013 | Baba | ....................... | H04L 9/083 380/279 |
| 2013/0138961 A1 | 5/2013 | Tsuji et al. | | |
| 2014/0089663 A1* | 3/2014 | Tanizawa | ................ | H04L 63/06 713/168 |
| 2014/0331050 A1* | 11/2014 | Armstrong | ............ | H04L 9/0819 713/171 |
| 2015/0121066 A1* | 4/2015 | Nix | ....................... | H04L 9/0816 713/155 |
| 2015/0288517 A1* | 10/2015 | Evans | ....................... | H04L 9/12 713/168 |
| 2016/0119783 A1 | 4/2016 | Zhao et al. | | |
| 2016/0149700 A1* | 5/2016 | Fu | ......................... | H04L 9/0858 380/278 |
| 2016/0226846 A1* | 8/2016 | Fu | ......................... | H04L 63/062 |
| 2017/0033926 A1* | 2/2017 | Fu | ......................... | H04L 9/0852 |
| 2017/0054555 A1* | 2/2017 | Yuan | ..................... | H04L 63/061 |
| 2017/0054556 A1* | 2/2017 | Fu | ......................... | H04W 12/06 |
| 2017/0126654 A1* | 5/2017 | Fu | ......................... | H04L 9/0858 |
| 2017/0214525 A1* | 7/2017 | Zhao | ................... | H04W 12/041 |
| 2017/0222803 A1* | 8/2017 | Tanizawa | ............ | H04L 63/0853 |
| 2018/0351734 A1 | 12/2018 | Zhao et al. | | |

FOREIGN PATENT DOCUMENTS

| | | |
|---|---|---|
| CN | 105871538 A | 8/2016 |
| JP | 2004-013560 A | 1/2004 |
| JP | 2014-068313 A | 4/2014 |
| JP | 2016-528756 A | 9/2016 |
| WO | 2012/025987 A1 | 3/2012 |
| WO | 2016/118359 A1 | 7/2016 |
| WO | 2016/177332 A1 | 11/2016 |

OTHER PUBLICATIONS

Witzke E.L. et al., "Final Report for the Network Authentication Investigation and Pilot", Sandia Report: 1-40 (2006).

Scarani V. et al., "The Security of Practical Quantum Key Distribution", Arxiv. Org Cornell University Library: 1-52 (2008).

Yuen H.P. et al., "No-clone smartcard via quantum memory", Physics Letters A, 265(3): 173-177 (2000).

Search Report for European Patent Application No. 17874729.1, dated Mar. 31, 2020.

Office Action for Japanese Patent Application No. 2019-548511, dated Sep. 1, 2020.

* cited by examiner

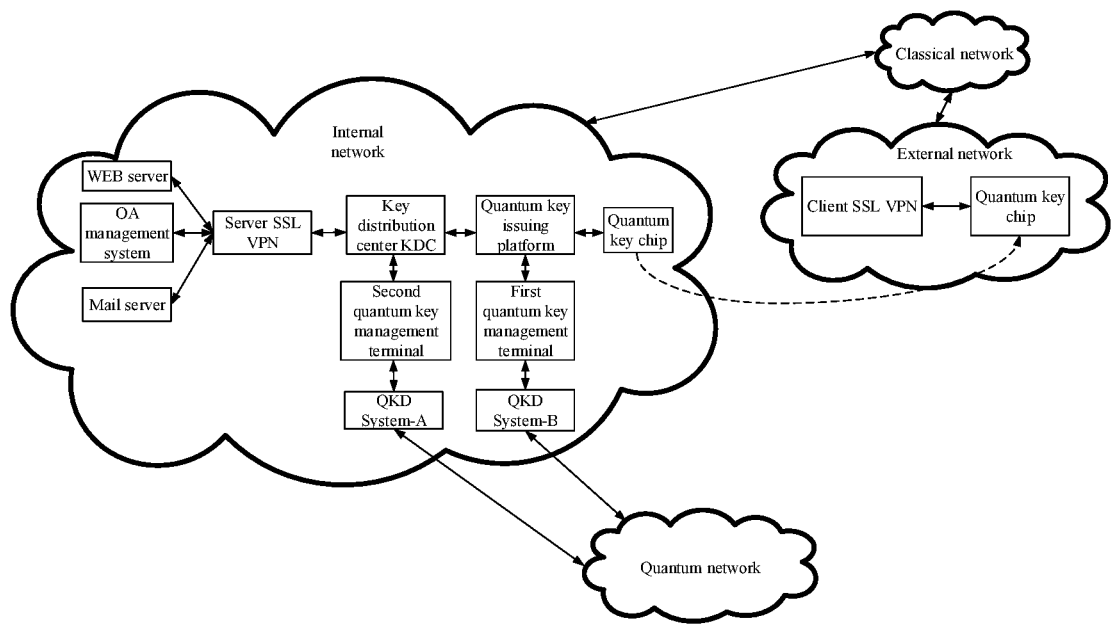

Figure 3

| Acquire, by the client SSL VPN, a first random number from the quantum key chip, send, by the client SSL VPN, the first random number to the server SSL VPN, and receive, by the client SSL VPN, a second random number sent by the server SSL VPN. | S401 |

↓

| Determine, by the client SSL VPN and the server SSL VPN in the negotiation, that the quantum key in the quantum key chip serves as a pre-master key, and send, by the client SSL VPN, an index of the quantum key serving as the pre-master key in the quantum key chip and identification information of the quantum key to the server SSL VPN, so that the server SSL VPN acquires the quantum key from the KDC as the pre-master key by using the index of the quantum key and the identification information of the quantum key. | S402 |

↓

| Acquire, by the client SSL VPN and the server SSL VPN, a session key based on the first random number, the second random number and the quantum key serving as the pre-master key through a predetermined algorithm. | S403 |

Figure 4

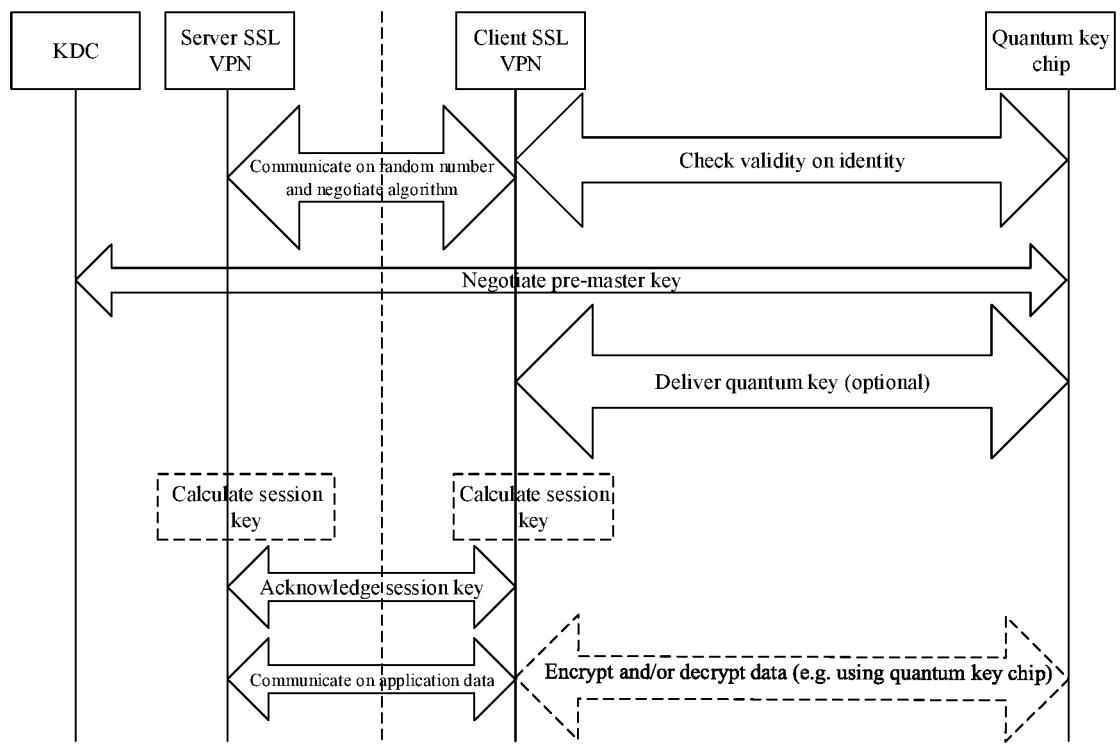

Figure 5

Determine, by the server SSL VPN and the client SSL VPN in the negotiation, that the quantum key in the quantum key chip serves as a session key. — S601

Send an index of the quantum key serving as the session key in the quantum key chip and identification information of the quantum key to the server SSL VPN, so that the server SSL VPN acquires the quantum key from the KDC as the session key by using the index of the quantum key and the identification information of the quantum key, where an ID of the quantum key chip and/or an ID of a user serve as the identification information of the quantum key in the quantum key chip, and the identification information is bound with the quantum key corresponding to the identification information by the KDC in advance. — S602

Figure 6

METHOD FOR ISSUING QUANTUM KEY CHIP, APPLICATION METHOD, ISSUING PLATFORM AND SYSTEM

This application is the national phase of International Application No. PCT/CN 2017/112256, titled "METHOD FOR ISSUING QUANTUM KEY CHIP, APPLICATION METHOD, ISSUING PLATFORM AND SYSTEM ", filed on Nov. 22, 2017, which claims priority to Chinese Patent Application No. 201611070527.7, titled "METHOD FOR ISSUING QUANTUM KEY CHIP, APPLICATION METHOD, ISSUING PLATFORM AND SYSTEM", filed on Nov. 28, 2016 with the State Intellectual Property Office of the People's Republic of China, which is incorporated herein by reference in its entirety.

FIELD

The present disclosure relates to the technical field of quantum communication, and in particular, to a method for issuing a quantum key chip, a method for applying a quantum key chip, an issuing platform and a system.

BACKGROUND

With the progress of Internet data technics and the development of business modes, Internet technology is booming nowadays. Information technology and network technology can help users improve business processes and implement service response. Meanwhile, networked service information brings security threats. There would be inestimable losses once the business data of the service and the sensitive data of the enterprise customers are leaked. There are further serious consequences in a case that the information in communication or storage is tampered with. Therefore, security issue in informatization of services is crucial.

In the field of conventional computer at present, a secure business network may be built through Secure Socket Layer virtual private network (SSL VPN, Secure Socket Layer Virtual Private Network) to meet requirements on point-to-net secure application. The SSL VPN technology is always built on the asymmetric key system. Under the condition that the asymmetric key algorithm has been expected to be cracked in the future, the security network built by the existing SSL VPN technology also faces a potential threat of being cracked.

SUMMARY

In order to address the above technical issues in the conventional technology, a method for issuing a quantum key chip, a method for applying a quantum key chip, an issuing platform and a system are provided in the present disclosure, which can avoid communication security issue that an asymmetric key is cracked and make communication more secure.

A method for issuing a quantum key chip is provided according to an embodiment of the present disclosure, including:
feeding, by a quantum key issuing platform, a quantum key into the quantum key chip, and binding, by the quantum key issuing platform, an ID of the quantum key chip in a one-to-one correspondence with an ID of a user using the quantum key chip, where the ID of the quantum key chip and/or the ID of the user serve as identification information of the quantum key in the quantum key chip, and the quantum key is obtained by pre-negotiation between the quantum key issuing platform and a key distribution center KDC; and
sending, by the quantum key issuing platform, the identification information of the quantum key to the KDC, so that the KDC binds the identification information to the quantum key corresponding to the identification information.

Preferably, obtaining the quantum key by the pre-negotiation between the quantum key issuing platform and the key distribution center KDC specifically includes:
establishing, by the quantum key issuing platform, a correspondence relationship with a first quantum key management terminal connected to the quantum key issuing platform, and establishing, by the key distribution center KDC, another correspondence relationship with a second quantum key management terminal connected to the key distribution center KDC;
performing, by the quantum key issuing platform and the KDC, negotiation to determine a quantity of quantum keys to be extracted, obtaining, by the quantum key issuing platform, an ID of the second quantum key management terminal from the KDC, and informing, by the quantum key issuing platform, the KDC of an ID of the first quantum key management terminal; and
requesting and receiving, by the quantum key issuing platform and the KDC, the quantum key of the negotiated quantity, from the quantum key management terminal corresponding to the quantum key issuing platform and the KDC, respectively, where the quantum key is sent by the first quantum key management terminal to the quantum key issuing platform, and the quantum key is sent by the second quantum key management terminal to the KDC.

A method for applying a quantum key chip is further provided according to an embodiment of the present disclosure, where the method is applied to a communication system of a Secure Socket Layer virtual private network SSL VPN, and the system includes a client SSL VPN, a server SSL VPN, a key distribution center KDC, and a quantum key chip;
in a case that negotiation on a quantum key performed by the client SSL VPN and the server SSL VPN is normal, the method includes:
acquiring, by the client SSL VPN, a first random number from the quantum key chip, sending, by the client SSL VPN, the first random number to the server SSL VPN, and receiving, by the client SSL VPN, a second random number sent by the server SSL VPN;
determining, by the client SSL VPN and the server SSL VPN in the negotiation, that the quantum key in the quantum key chip serves as a pre-master key, and sending, by the client SSL VPN, an index of the quantum key serving as the pre-master key in the quantum key chip and identification information of the quantum key to the server SSL VPN, so that the server SSL VPN acquires the quantum key from the KDC as the pre-master key by using the index of the quantum key and the identification information of the quantum key, where an ID of the quantum key chip and/or an ID of a user serve as the identification information of the quantum key in the quantum key chip, and the identification information is bound with the quantum key corresponding to the identification information by the KDC in advance; and
acquiring, by the client SSL VPN and the server SSL VPN, a session key based on the first random number, the second random number and the quantum key serving as the pre-master key through a predetermined algorithm.

Preferably, acquiring, by the client SSL VPN, the session key based on the first random number, the second random number and the quantum key serving as the pre-master key through the predetermined algorithm specifically includes:

acquiring, by the client SSL VPN, the quantum key serving as the pre-master key from the quantum key chip, and acquiring, by the client SSL VPN, the session key based on the first random number, the second random number, and the quantum key serving as the pre-master key through the predetermined algorithm; or, informing, by the client SSL VPN, the quantum key chip of the second random number and the predetermined algorithm, and receiving, by the client SSL VPN, the session key returned by the quantum key chip, where the session key is calculated by the quantum key chip based on the quantum key serving as the pre-master key, the first random number, and the second random number through the predetermined algorithm.

Preferably, in a case that negotiation on a quantum key performed by the client SSL VPN and the server SSL VPN is abnormal, the method includes:

sending, by the client SSL VPN, a generated first random number to the server SSL VPN, and receiving, by the client SSL VPN, a second random number sent by the server SSL VPN;

performing, by the client SSL VPN and the server SSL VPN, negotiation on a pre-master key; and acquiring, by the client SSL VPN and the server SSL VPN, a session key based on the first random number, the second random number, and the pre-master key through a predetermined algorithm.

Preferably, the method further includes: encrypting and/or decrypting, by the client SSL VPN or the quantum key chip, application data via the session key.

A method for applying a quantum key chip is further provided according to an embodiment of the present disclosure, where the method is applied to a communication system of a Secure Socket Layer virtual private network SSL VPN, and the system includes a client SSL VPN, a sever SSL VPN, a key distribution center KDC, and a quantum key chip;

in a case that negotiation on a quantum key performed by the client SSL VPN and the server SSL VPN is normal, the method includes:

determining, by the server SSL VPN and the client SSL VPN in the negotiation, that the quantum key in the quantum key chip serves as a session key; and sending an index of the quantum key serving as the session key in the quantum key chip and identification information of the quantum key to the server SSL VPN, so that the server SSL VPN acquires the quantum key from the KDC as the session key by using the index of the quantum key and the identification information of the quantum key, where an ID of the quantum key chip and/or an ID of a user serve as the identification information of the quantum key in the quantum key chip, and the identification information is bound with the quantum key corresponding to the identification information by the KDC in advance.

Preferably, in a case that negotiation on a quantum key performed by the client SSL VPN and the server SSL VPN is abnormal, the method includes:

sending, by the client SSL VPN, a generated first random number to the server SSL VPN, and receiving, by the client SSL VPN, a second random number sent by the server SSL VPN;

performing, by the client SSL VPN and the server SSL VPN, negotiation on a pre-master key; and acquiring, by the client SSL VPN and the server SSL VPN, a session key based on the first random number, the second random number, and the pre-master key through a predetermined algorithm.

Preferably, the method further includes:

encrypting and/or decrypting, by the client SSL VPN or the quantum key chip, application data via the session key.

An issuing platform is further provided according to an embodiment of the present disclosure, including a feeding unit, a binding unit, and a sending unit, where:

the feeding unit is configured to feed a quantum key into a quantum key chip, where the quantum key is obtained by pre-negotiation with a key distribution center KDC;

the binding unit is configured to bind an ID of the quantum key chip in a one-to-one correspondence with an ID of a user using the quantum key chip, where the ID of the quantum key chip and/or the ID of the user serve as identification information of the quantum key in the quantum key chip; and the sending unit is configured to send the identification information of the quantum key to the KDC, so that the KDC binds the identification information to the quantum key corresponding to the identification information.

A system for applying a quantum key is further provided according to an embodiment of the present disclosure, including a quantum key chip, a client SSL VPN, a server SSL VPN, and a key distribution center KDC, where:

the client SSL VPN is configured to, in case of determining that negotiation on the quantum key performed with the server SSL VPN is normal, acquire a first random number from the quantum key chip, send the first random number to the server SSL VPN, and receive a second random number sent by the server SSL VPN; determine in the negotiation with the server SSL VPN that the quantum key in the quantum key chip serves as a pre-master key, and send an index of the quantum key serving as the pre-master key in the quantum key chip and identification information of the quantum key to the server SSL VPN;

the quantum key chip is configured to generate the first random number;

the server SSL VPN is configured to acquire the quantum key from the KDC as the pre-master key by using the index of the quantum key and the identification information of the quantum key;

the KDC is configured to bind the identification information with the quantum key corresponding to the identification information in advance, where an ID of the quantum key chip and/or an ID of a user serve as the identification information of the quantum key in the quantum key chip; and the client SSL VPN and the server SSL VPN are further configured to acquire a session key based on the first random number, the second random number and the quantum key serving as the pre-master key through a predetermined algorithm.

Preferably, the client SSL VPN is configured to acquire the session key based on the first random number, the second random number and the quantum key serving as the pre-master key through the predetermined algorithm, where:

the client SSL VPN is configured to acquire the quantum key from the quantum key chip as the pre-master key, and acquire the session key based on the first random number, the second random number and the quantum key serving as the pre-master key through the predetermined algorithm;

or, the client SSL VPN is configured to inform the quantum key chip of the second random number and the predetermined algorithm; the quantum key chip is configured to calculate the session key by using the quantum key serving as the pre-master key, the first random number, the second random number, and the predetermined algorithm; and send the session key to the client SSL VPN.

Preferably, the client SSL VPN is further configured to, in case of determining that the negotiation on the quantum key performed by the client SSL VPN and the server SSL VPN is abnormal, send a generated first random number to the server SSL VPN;

the server SSL VPN is configured to send a generated second random number to the client SSL VPN;

the client SSL VPN and the server SSL VPN are further configured to perform negotiation on a pre-master key; and the client SSL VPN and the server SSL VPN are further configured to acquire a session key based on the first random number, the second random number, and the pre-master key through a predetermined algorithm.

Preferably, the client SSL VPN is further configured to encrypt and/or decrypt application data via the session key, or the quantum key chip is further configured to encrypt and/or decrypt application data via the session key.

A system for applying a quantum key is further provided according to an embodiment of the present disclosure, including a quantum key chip, a client SSL VPN, a server SSL VPN, and a key distribution center KDC, where:

the client SSL VPN is configured to, in case of determining that negotiation on the quantum key performed with the server SSL VPN is normal, determine in the negotiation with the server SSL VPN that the quantum key in the quantum key chip serves as a session key, and send an index of the quantum key serving as the session key in the quantum key chip and identification information of the quantum key to the server SSL VPN;

the server SSL VPN is configured to acquire the quantum key from the KDC as the session key by using the index of the quantum key and the identification information of the quantum key; and the KDC is configured to bind the identification information with the quantum key corresponding to the identification information in advance, where an ID of the quantum key chip and/or an ID of a user serve as the identification information of the quantum key in the quantum key chip.

Preferably, the client SSL VPN is further configured to, in case of determining that negotiation on the quantum key with the server SSL VPN is abnormal, send a generated first random number to the server SSL VPN, and receive a second random number sent by the server SSL VPN;

the client SSL VPN and the server SSL VPN are further configured to perform negotiation on a pre-master key; and the client SSL VPN and the server SSL VPN are further configured to acquire a session key based on the first random number, the second random number, and the pre-master key through a predetermined algorithm.

Preferably, the client SSL VPN is further configured to encrypt and/or decrypt application data via the session key, or the quantum key chip is further configured to encrypt and/or decrypt application data via the session key.

Compared with the conventional technology, the present invention has at least following advantages.

The issuing method according to the present disclosure feeds the quantum key into the quantum key chip, and the ID of the quantum key chip and/or the ID of the user serve as the identification information of the quantum key. Thereby, the KDC can effectively manage the quantum key, facilitating subsequent specific application of the quantum key chip. In addition, since the quantum key chip is convenient to carry and easy to use, the quantum key chip can be combined with SSL VPN, which is a point-to-terminal access manner, thereby effectively improving convenience of applying the quantum key to a mobile terminal. The mobile terminal may be a mobile device such as a mobile phone or a PAD. A security level of the quantum key is high, hence avoiding a security risk due to an asymmetric algorithm in a traditional SSL VPN system.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

FIG. 3 is a schematic diagram of a scenario of an issuing method according to the present disclosure;

FIG. 4 is a flowchart of a first embodiment of a method for applying a quantum key chip according to the present disclosure;

FIG. 5 is a signaling diagram corresponding to a first embodiment of a method for applying a quantum key chip according to the present disclosure;

FIG. 6 is a flowchart of a second embodiment of a method for applying a quantum key chip according to the present disclosure;

DETAILED DESCRIPTION

For those skilled in the art better understanding the solution of the present disclosure, Hereinafter technical solutions in embodiments of the present disclosure are described clearly and completely in conjunction with the drawings in embodiments of the present disclosure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

First Embodiment of an Issuing Method

Figure 1:
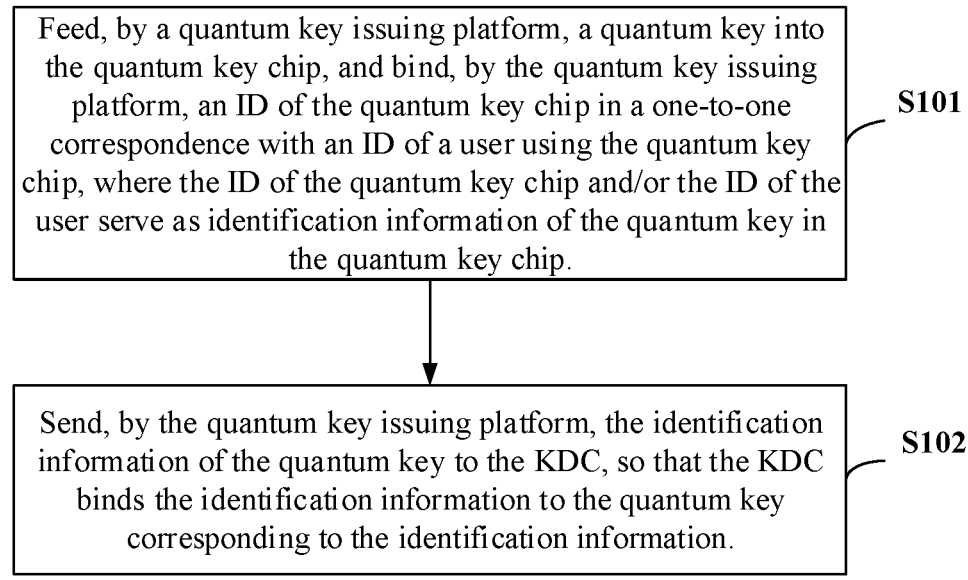
FIG. 1 is a flowchart of a first embodiment of a method for issuing a quantum key chip according to the present disclosure.

Reference is made to FIG. 1, which is a flowchart of a first embodiment of a method for issuing a quantum key chip according to the present disclosure.

The method for issuing a quantum key chip according to this embodiment includes steps S101 and S102.

In S101, a quantum key issuing platform feeds a quantum key into a quantum key chip, and binds an ID of the quantum key chip in a one-to-one correspondence with an ID of a user using the quantum key chip. The ID of the quantum key chip and/or the ID of the user serve as identification information of the quantum key in the quantum key chip. The quantum key is obtained by pre-negotiation between the quantum key issuing platform and a key distribution center (KDC, Key Distribution Center).

It can be understood that the quantum key negotiated by the quantum key issuing platform and the KDC is a shared quantum key. Namely, the quantum key issuing platform and the KDC have quantum keys of a same quantity and same content.

The quantum key chip is finally issued to the user for usage. Therefore, the quantum key chip has a one-to-one correspondence with the ID of the user, and a preset PIN code may also be set upon issuance. In a case that the user uses the quantum key chip, the preset PIN code needs to be inputted to check whether the user is valid.

The quantum key in the quantum key chip may be labeled with the ID of the quantum key chip, or labeled with the ID of the user, or labeled with an association of the ID of the user and the ID of the quantum key chip.

In S102, the quantum key issuing platform sends the identification information of the quantum key to the KDC, so that the KDC binds the identification information to the quantum key corresponding to the identification information.

Since the KDC may store a lot of quantum keys, it is necessary for the KDC to use the identification information of the quantum key to search for the quantum key corresponding to the identification information.

The issuing method according to the present disclosure feeds the quantum key into the quantum key chip, and the ID of the quantum key chip and/or the ID of the user serve as the identification information of the quantum key. Thereby, the KDC can effectively manage the quantum key, facilitating subsequent specific application of the quantum key chip. In addition, since the quantum key chip is convenient to carry and easy to use, the quantum key chip can be combined with SSL VPN, which is a point-to-terminal access manner, thereby effectively improving convenience of applying the quantum key to a mobile terminal. The mobile terminal may be a mobile device such as a mobile phone or a PAD. A security level of the quantum key is high, hence avoiding a security risk due to an asymmetric algorithm in a traditional SSL VPN system.

Second Embodiment of an Issuing Method

Figure 2:
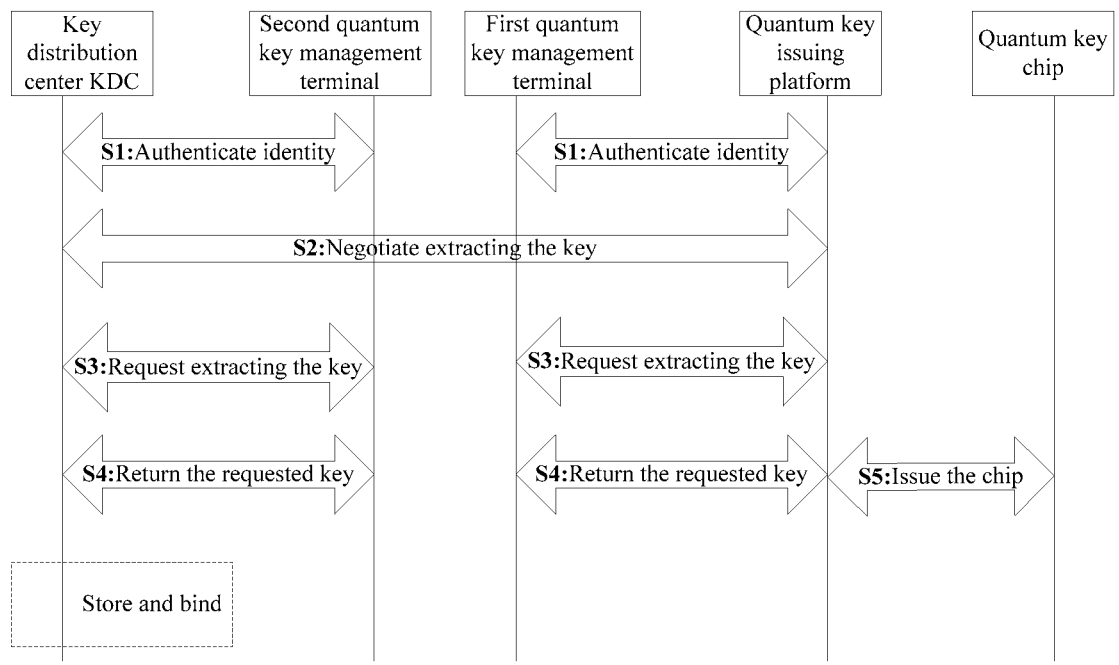
FIG. 2 is a signaling diagram of a method for issuing a quantum key chip according to the present disclosure.

Reference is made to FIG. 2, which is a signaling diagram of a method for issuing a quantum key chip according to the present disclosure.

It should be noted that the quantum key issuing platform and the KDC may correspond to a same quantum key management terminal, or correspond to different quantum key management terminals. Hereinafter a case of corresponding to different quantum key management terminals is taken as an example. The same principle also applies to a case that the quantum key issuing platform and the KDC correspond to the same quantum key management terminal.

In S1, the quantum key issuing platform establishes a correspondence relationship with a first quantum key management terminal connected to the quantum key issuing platform, and the key distribution center KDC establishes a correspondence relationship with a second quantum key management terminal connected to the KDC. The KDC and the quantum key issuing platform, respectively, authenticate the quantum key management terminals connected thereto, based on the established correspondence relationship.

It should be noted that authentication of the quantum key management terminal is not an indispensable step, but for improving security.

In S2, the KDC and the quantum key issuing platform negotiate to determine a quantity of quantum keys to be extracted. The quantum key issuing platform obtains an ID of the second quantum key management terminal from the KDC, and informs the KDC of an ID of the first quantum key management terminal.

In S3, the quantum key issuing platform and the KDC request, after negotiating, the quantum keys from the quantum key management terminals connected thereto, respectively.

Namely, the KDC requests the quantum key from the second quantum key management terminal, and the quantum key issuing platform requests the quantum key from the first quantum key management terminal.

In S4, the KDC and the quantum key issuing platform receive the quantum keys returned by the corresponding quantum key management terminal, respectively.

Preferably, the quantum key management terminal performs detection on a key pool. It is detected whether a quantity of remaining quantum keys in the key pool satisfies a requirement. In case of being positive, the quantum keys of the negotiated quantity are directly returned. In case of being negative, a notification may be returned and the KDC and the quantum key issuing platform re-negotiate to determine the quantity of quantum keys to be extracted, or, the quantum keys of the corresponding quantity may be returned after the quantity of the quantum keys in the key pool meets the requirement.

In S5, the quantum key issuing platform feeds the quantum key into the quantum key chip, and binds an ID of the quantum key chip in a one-to-one correspondence with an ID of a user using the quantum key chip. The ID of the quantum key chip and/or the ID of the user serve as identification information of the quantum key in the quantum key chip.

It should be noted that the quantum key issuing platform sends the identification information of the quantum key to the KDC. The KDC binds and stores the identification information of the quantum key with the corresponding quantum key, to facilitate searching for the corresponding quantum key in subsequent use of the quantum key chip.

In addition, the quantum key issuing platform sets a PIN code of the quantum key chip for validity check in a case the user uses the quantum key chip.

Generally, the quantum key stored in the quantum key management terminal is labeled by a device ID of another quantum key management terminal that shares the quantum key. Thus, the KDC and the quantum key issuing platform may request and acquire, based on the device ID, shared quantum keys of the corresponding quantity from the quantum key management terminals connected thereto, respectively, by negotiating the quantity of quantum keys to be extracted and device IDs of both quantum key management terminals.

It should be noted that hereinabove described is a case that the KDC and the quantum key issuing platform correspond to different quantum key management terminals. In a case that the KDC and the quantum key issuing platform correspond to the same quantum key management terminal, the key management terminal may send the quantum key to the KDC, make a copy of the quantum key, and send the copy to the quantum key issuing platform.

For better understanding the method according to the above embodiment, hereinafter illustration is further made in conjunction with an application scenario. Detailed reference is made to FIG. 3, which is a schematic diagram of a scenario of an issuing method according to the present disclosure.

FIG. 3 is divided into an internal network and an external network in terms of domain, and an SSL VPN serves as a border device for the external network accessing the internal network.

It can be understood that the quantum key chip is used by a user after issuance. Thereby, a quantum key chip in the external network is used by a user after issuance. A quantum key chip in the internal network and the quantum key chip in the external network are a same one. To facilitate understanding, the quantum key chip is placed in the internal network to describe the issuance process.

An application server (e.g., a Web server, an OA management system, a mail server, etc.), a server SSL VPN, a KDC, a quantum key management terminal, a quantum key distribution (QKD, Quantum Key Distribution) system and a quantum key issuing platform are required to be deployed in the internal network. A quantum key chip serves as a mobile device, and is distributed to a user after issuance from the internal network.

Main functions are described as follows.

The SSL VPN is configured to verify access at the border, and is an entrance at the border of the internal network;

The QKD system is configured to generate a quantum key through a quantum network.

The quantum key management terminal is configured to acquire and store the quantum key generated by the QKD system;

The KDC is configured to negotiate with the quantum key issuing platform, implement an operation of extracting the quantum key from the quantum key management terminal, register the identification information of the quantum key, and bind and maintain the correspondence relationship between the quantum key and the quantum key chip. The identification information of the quantum key may be the ID of the quantum key chip and/or the ID of the user.

The quantum key issuing platform is configured to negotiate with the KDC on extracting the quantum key, implement the issuance of the quantum key chip, feed the quantum key into the quantum key chip, and bind the ID of the quantum key chip in a one-to-one correspondence with the ID of the user.

The quantum key chip is configured to carry the quantum key, and is bound to the user in the one-to-one correspondence.

It should be noted that the KDC, the quantum key issuing platform, the quantum key management terminal, and the QKD may be separate or integrated.

Hereinafter a method of applying a quantum key chip issued by the issuing method according to the above embodiment is described in conjunction with drawings.

First Embodiment of the Application Method

Reference is made to FIG. 4, which is a flowchart of the first embodiment of a method for applying a quantum key chip according to the present disclosure.

A method for applying a quantum key chip is provided according to the embodiment. The method is applied to a communication system of a secure socket layer virtual private network SSL VPN. The system includes: a client SSL VPN, a server SSL VPN, a key distribution center KDC, and a quantum key chip.

The method includes steps S401 to S403, in a case that negotiation on a quantum key performed by the client SSL VPN and the server SSL VPN is normal.

In S401, the client SSL VPN acquires a first random number from the quantum key chip, sends the first random number to the server SSL VPN, and receives a second random number sent by the server SSL VPN.

In S402, the client SSL VPN and the server SSL VPN negotiate to determine that the quantum key in the quantum key chip serves as a pre-master key, and the client SSL VPN sends an index of the quantum key serving as the pre-master key in the quantum key chip and identification information of the quantum key to the server SSL VPN, so that the server SSL VPN acquires the quantum key from the KDC as the pre-master key by using the index of the quantum key and the identification information of the quantum key. An ID of the quantum key chip and/or an ID of a user serve as the identification information of the quantum key in the quantum key chip, and the identification information is bound with the quantum key corresponding to the identification information by the KDC in advance.

In S403, the client SSL VPN and the server SSL VPN acquire a session key based on the first random number, the second random number and the quantum key serving as the pre-master key through a predetermined algorithm.

That the client SSL VPN acquires the session key based on the first random number, the second random number and the quantum key serving as the pre-master key through the predetermined algorithm specifically includes following steps.

The client SSL VPN acquires the quantum key serving as the pre-master key from the quantum key chip, and acquires the session key based on the first random number, the second random number, and the quantum key serving as the pre-master key through the predetermined algorithm.

Or, the client SSL VPN informs the quantum key chip of the second random number and the predetermined algorithm, and receives the session key returned by the quantum key chip. The session key is calculated by the quantum key chip based on the quantum key serving as the pre-master key, the first random number, and the second random number through the predetermined algorithm.

In the embodiment, the first random number and the pre-master key are provided by the quantum key chip. In such case, high security characteristic of the quantum key can be fully utilized, facilitating increasing an update frequency of the pre-master key. Thereby, security of an original SSL protocol is improved as a whole.

In the method provided above, the first random number may be generated by the quantum key chip, and the quantum key in the quantum key chip serves as the pre-master key, in a case that the negotiation on the quantum key performed by the client SSL VPN and the server SSL VPN is normal. However, the quantum key in the quantum key chip cannot serve as the pre-master key in a case that negotiation on the quantum key performed by the client SSL VPN and the server SSL VPN is abnormal. Therefore, the negotiation on the pre-master key may be performed through an original negotiation mechanism in the SSL protocol. Namely, reference is made to following negotiation mechanism of the SSL protocol.

In the case that the negotiation on the quantum key performed by the client SSL VPN and the server SSL VPN is abnormal, the method includes following steps.

The client SSL VPN sends a generated first random number to the server SSL VPN, and receives a second random number sent by the server SSL VPN.

The client SSL VPN and the server SSL VPN perform negotiation on a pre-master key.

The client SSL VPN and the server SSL VPN acquire a session key based on the first random number, the second random number, and the pre-master key through a predetermined algorithm.

In the embodiment, the negotiation mechanism of the pre-master key existing in the original SSL protocol may be utilized in a case that there is a problem in the negotiation on the quantum key. Namely, there are two sources of the pre-master key. In a case that there is a problem in using the quantum key as the pre-master key, a pre-master key under the original negotiation mechanism of the SSL protocol may be used, thereby being effectively compatible with the original SSL protocol. It is preferable to use the quantum key as the pre-master key. Detailed reference is made to FIG. 5, which is a signaling diagram corresponding to the first embodiment of the application method. It should be noted that it requires validity check when the user uses the quantum key chip. For example, a PIN code is preset upon issuance, and legal permission to an application is given to a user only when the check is positive. It can be understood that the validity check may be implemented in other ways. For example, biological characteristics are used for validity check. For example, validity of the user is verified via fingerprints.

In addition, the method further includes: the client SSL VPN or the quantum key chip encrypts and/or decrypts application data via the session key.

Calculation of the session key and encryption and/or decryption of application data may be implemented in the quantum key chip. Or, the quantum key chip may serve as a provider that provides the quantum key and the random number to the client SSL VPN, and the calculation of the session key and/or the encryption and decryption of application data are implemented by the client SSL VPN itself.

Second Embodiment of the Application Method

Reference is made to FIG. 6, which is a flowchart of a second embodiment of a method for applying a quantum key chip according to the present disclosure.

The method for applying the quantum key chip according to the embodiment is applied to a communication system of a secure socket layer virtual private network SSL VPN. The system includes a client SSL VPN, a server SSL VPN, a key distribution center KDC, and a quantum key chip.

In a case that negotiation on a quantum key performed by the client SSL VPN and the server SSL VPN is normal, the method includes steps S601 and S602.

In S601, the server SSL VPN and the client SSL VPN determine in the negotiation that the quantum key in the quantum key chip serves as a session key.

In S602, an index of the quantum key serving as the session key in the quantum key chip and identification information of the quantum key are sent to the server SSL VPN, so that the server SSL VPN acquires the quantum key from the KDC as the session key by using the index of the quantum key and the identification information of the quantum key. An ID of the quantum key chip and/or an ID of a user serve as the identification information of the quantum key in the quantum key chip. The identification information is bound with the quantum key corresponding to the identification information by the KDC in advance.

In the embodiment, the quantum key in the quantum key chip directly serves as the session key. In such case, high security characteristic of the quantum key can be fully utilized, facilitating increasing an update frequency of the session key. Thereby, security of the original SSL protocol is improved as a whole.

In the method provided above, the quantum key in the quantum key chip directly serves as the session key in a case that the negotiation on the quantum key performed by the client SSL VPN and the server SSL VPN is normal. However, the quantum key in the quantum key chip cannot serve as the session key in a case that the negotiation on the quantum key performed by the client SSL VPN and the server SSL VPN is abnormal. Therefore, negotiation on the pre-master key and calculation of the session key may be performed through an original negotiation mechanism in the SSL protocol. Namely, reference is made to the following negotiation mechanism of the SSL protocol.

In the case that negotiation on the quantum key performed by the client SSL VPN and the server SSL VPN is abnormal, the method includes following steps.

The client SSL VPN sends a generated first random number to the server SSL VPN, and receives a second random number sent by the server SSL VPN.

The client SSL VPN performs negotiation with the server SSL VPN on a pre-master key.

The client SSL VPN and the server SSL VPN acquire a session key based on the first random number, the second random number, and the pre-master key through a predetermined algorithm.

Figure 7:
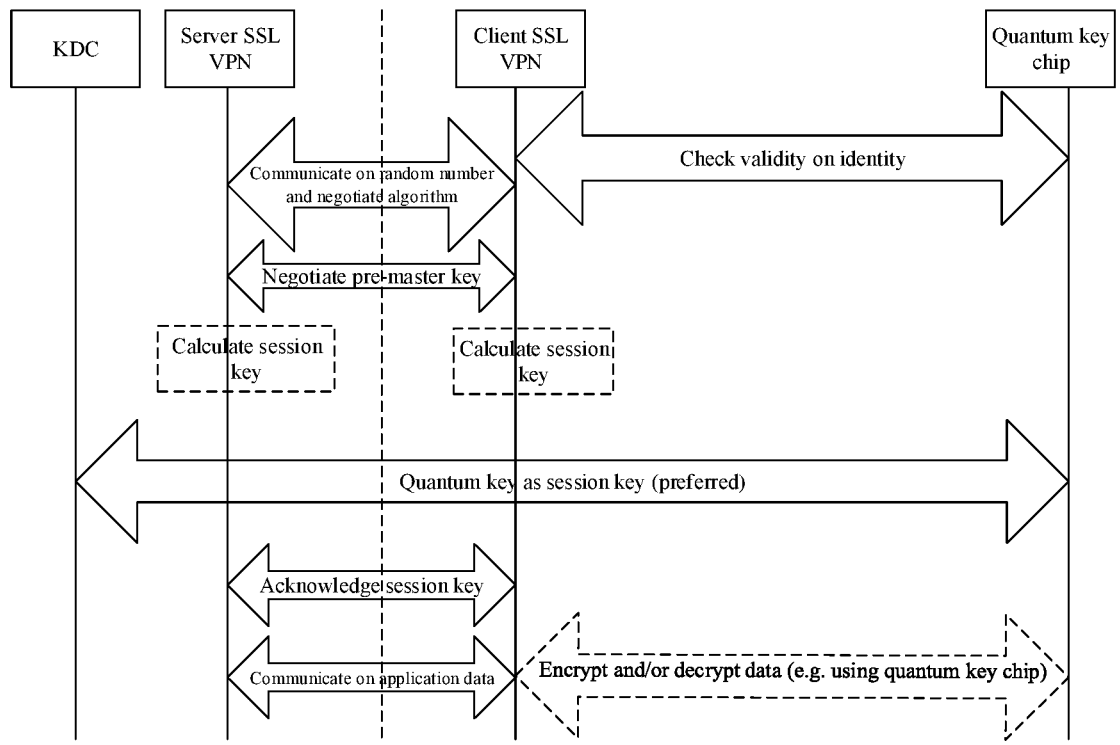
FIG. 7 is a signaling diagram corresponding to a second embodiment of a method for applying a quantum key chip according to the present disclosure.

In the embodiment, the negotiation mechanism of the pre-master key existing in the original SSL protocol may be utilized to calculate the session key, in a case that there is a problem in the negotiation on the quantum key. Namely, there are two sources of the session key. In a case that there is a problem in using the quantum key as the pre-master key, a pre-master key under the original negotiation mechanism of the SSL protocol may be used to calculate the session key, thereby being effectively compatible with the original SSL protocol. It is preferable to use the quantum key as the session key. Detailed reference is made to FIG. 7, which is a signaling diagram corresponding to the second embodiment of the application method. The same parts as those in FIG. 5 are not repeatedly described.

In addition, the method further includes a following step.

The client SSL VPN or the quantum key chip encrypts and/or decrypts application data via the session key.

Calculation of the session key and encryption and/or decryption of application data may be implemented in the quantum key chip. Or, the quantum key chip may serve as a provider that provides the quantum key to the client SSL VPN, and the client SSL VPN encrypts and/or decrypts the application data by using the session key.

Based on the methods for issuing and applying the quantum key chip according to the above embodiments, an issuing platform is further provided according to the present disclosure. Hereinafter the issuing platform is described in detail in conjunction with the drawings.

Figure 8:
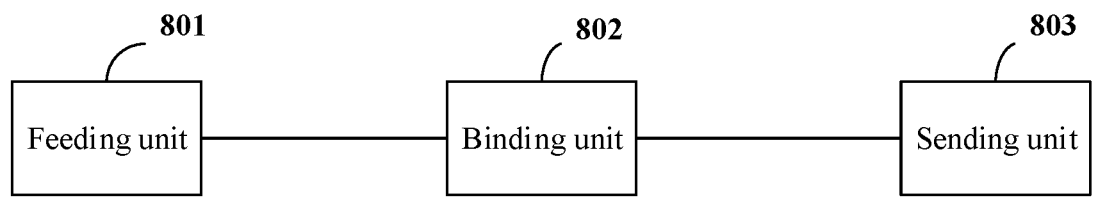
FIG. 8 is a schematic diagram of an issuing platform according to the present disclosure.

Reference is made to FIG. 8, which is a schematic diagram of an issuing platform according to the present disclosure.

The issuing platform according to the embodiment includes a feeding unit 801, a binding unit 802, and a sending unit 803.

The feeding unit 801 is configured to feed a quantum key into a quantum key chip. The quantum key is obtained by pre-negotiation with a key distribution center KDC.

The binding unit 802 is configured to bind an ID of the quantum key chip in a one-to-one correspondence with an ID of a user using the quantum key chip. The ID of the quantum key chip and/or the ID of the user serve as identification information of the quantum key in the quantum key chip.

The sending unit 803 is configured to send the identification information of the quantum key to the KDC, so that the KDC binds the identification information to the quantum key corresponding to the identification information.

The issuing platform according to the present disclosure feeds the quantum key into the quantum key chip, and the ID of the quantum key chip and/or the ID of the user serve as the identification information of the quantum key. Thereby, the KDC can effectively manage the quantum key, facilitating subsequent specific application of the quantum key chip. In addition, since the quantum key chip is convenient to carry and easy to use, the quantum key chip can be combined with SSL VPN, which is a point-to-terminal access manner, thereby effectively improving convenience of applying the quantum key to a mobile terminal. The mobile terminal may be a mobile device such as a mobile phone or a PAD. A security level of the quantum key is high, hence avoiding a security risk due to an asymmetric algorithm in a traditional SSL VPN system.

It can be understood that the issuing platform is the quantum key issuing platform described in other embodiments.

First Embodiment of an Application System

Figure 9:
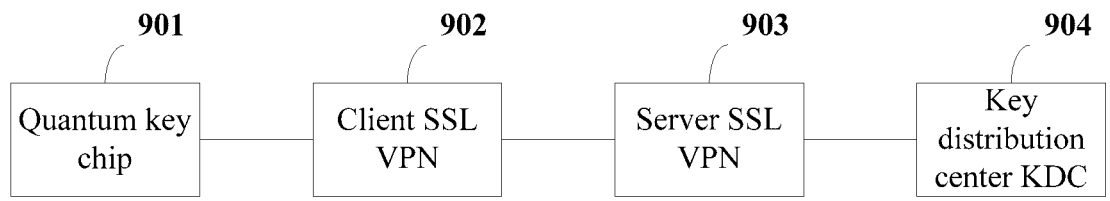
FIG. 9 is a schematic diagram of a first embodiment of a system for applying a quantum key according to the present disclosure.

Reference is made to FIG. 9, which is a schematic diagram of the first embodiment of a system for applying a quantum key according to the present disclosure.

A system for applying a quantum key according to the embodiment includes: a quantum key chip 901, a client SSL VPN 902, a server SSL VPN 903, and a key distribution center KDC 904.

The client SSL VPN 902 is configured to, in case of determining that negotiation on the quantum key performed with the server SSL VPN 903 is normal, acquire a first random number from the quantum key chip 901, send the first random number to the server SSL VPN 903, and receive a second random number sent by the server SSL VPN 903; determine in the negotiation with the server SSL VPN 903 that the quantum key in the quantum key chip 901 serves as a pre-master key, and send an index of the quantum key serving as the pre-master key in the quantum key chip 901 and identification information of the quantum key to the server SSL VPN 903.

The quantum key chip 901 is configured to generate the first random number.

The server SSL VPN 903 is configured to acquire the quantum key from the KDC 904 as the pre-master key by using the index of the quantum key and the identification information of the quantum key.

The KDC 904 is configured to bind the identification information with the quantum key corresponding to the identification information in advance. An ID of the quantum key chip 901 and/or an ID of a user serve as the identification information of the quantum key in the quantum key chip 901.

The client SSL VPN 902 and the server SSL VPN 903 are further configured to acquire a session key based on the first random number, the second random number and the quantum key serving as the pre-master key through a predetermined algorithm.

The client SSL VPN 902 acquires the session key based on the first random number, the second random number and the quantum key serving as the pre-master key through the predetermined algorithm, which are specifically as follows.

The client SSL VPN 902 is configured to acquire the quantum key from the quantum key chip 901 as a pre-master key, and acquire the session key based on the first random number, the second random number and the quantum key serving as the pre-master key through the predetermined algorithm.

Or, the client SSL VPN 902 is configured to inform the quantum key chip 901 of the second random number and the predetermined algorithm. The quantum key chip 901 is configured to calculate a session key by using the quantum key serving as the pre-master key, the first random number, the second random number, and the predetermined algorithm, and send the session key to the client SSL VPN 902.

In the present embodiment, the first random number and the pre-master key are provided by the quantum key chip 901. In such case, high security characteristic of the quantum key can be fully utilized, facilitating increasing an update frequency of the pre-master key. Thereby, the security of the original SSL protocol is improved as a whole.

In the system provided above, the first random number may be generated by the quantum key chip 901, and the quantum key in the quantum key chip 901 serve as the pre-master key, in a case that the negotiation on the quantum key performed by the client SSL VPN 902 and the server SSL VPN 903 is normal. However, the quantum key in the quantum key chip 901 cannot serve as the pre-master key in a case that negotiation on the quantum key performed by the client SSL VPN 902 and the server SSL VPN 903 is abnormal. Therefore, the negotiation on the pre-master key may be performed through an original negotiation mechanism in the SSL protocol.

Namely, the client SSL VPN 902 is further configured to send a generated first random number to the server SSL VPN 903, in case of determining that the negotiation on the quantum key performed by the client SSL VPN 902 and the server SSL VPN 903 is abnormal.

The server SSL VPN 903 is configured to send a generated second random number to the client SSL VPN 902.

The client SSL VPN 902 and the server SSL VPN 903 are configured to perform negotiation on a pre-master key.

The client SSL VPN 902 and the server SSL VPN 903 are configured to acquire a session key based on the first random number, the second random number, and the pre-master key through a predetermined algorithm.

In the embodiment, the negotiation mechanism of the pre-master key existing in the original SSL protocol may be utilized in a case that there is a problem in the negotiation on the quantum key. Namely, there are two sources of the pre-master key. In a case that there is a problem in using the quantum key as the pre-master key, a pre-master key under the original negotiation mechanism of the SSL protocol may be used, thereby being effectively compatible with the original SSL protocol. It is preferable to use the quantum key as the pre-master key.

In addition, the client SSL VPN 902 is further configured to encrypt and/or decrypt application data via the session key.

Or, the quantum key chip 901 is further configured to encrypt and/or decrypt application data via the session key.

Calculation of the session key and encryption and/or decryption of application data may be implemented in the quantum key chip 901. Or, the quantum key chip 901 may serve as a provider that provides the quantum key and the random number to the client SSL VPN 902, and the calculation of the session key and/or the encryption and decryption of application data are implemented by the client SSL VPN 902 itself.

Second Embodiment of an Application System

A system for applying a quantum key according to the embodiment includes: a quantum key chip, a client SSL VPN, a server SSL VPN, and a key distribution center KDC.

The client SSL VPN is configured to, in case of determining that negotiation on the quantum key performed with the server SSL VPN is normal, determine in the negotiation with the server SSL VPN that the quantum key in the quantum key chip serves as a session key, and send an index of the quantum key serving as the session key in the quantum key chip and identification information of the quantum key to the server SSL VPN.

The server SSL VPN is configured to acquire the quantum key from the KDC as the session key by using the index of the quantum key and the identification information of the quantum key.

The KDC is configured to bind the identification information with the quantum key corresponding to the identification information in advance. An ID of the quantum key chip and/or an ID of a user serve as the identification information of the quantum key in the quantum key chip.

In the embodiment, the quantum key in the quantum key chip directly serves as the session key. In such case, high security characteristic of the quantum key can be fully utilized, facilitating increasing an update frequency of the session key. Thereby, security of the original SSL protocol is improved as a whole.

In the system provided above, the quantum key in the quantum key chip directly serves as the session key in a case that the negotiation on the quantum key performed by the client SSL VPN and the server SSL VPN is normal. However, the quantum key in the quantum key chip cannot serve as the session key in a case that the negotiation on the quantum key performed by the client SSL VPN and the server SSL VPN is abnormal. Therefore, negotiation on the pre-master key and calculation of the session key may be performed through an original negotiation mechanism in the SSL protocol.

The client SSL VPN is further configured to, in case of determining that negotiation on the quantum key with the server SSL VPN is abnormal, send a generated first random number to the server SSL VPN, and receive a second random number sent by the server SSL VPN.

The client SSL VPN and the server SSL VPN are further configured to perform negotiation on a pre-master key.

The client SSL VPN and the server SSL VPN are further configured to acquire a session key based on the first random number, the second random number, and the pre-master key through a predetermined algorithm.

In addition, the client SSL VPN is further configured to encrypt and/or decrypt application data via the session key.

Or, the quantum key chip is further configured to encrypt and/or decrypt application data via the session key.

Security can be improved by using the quantum key chip to encrypt and/or decrypt the application data.

Figure 10:
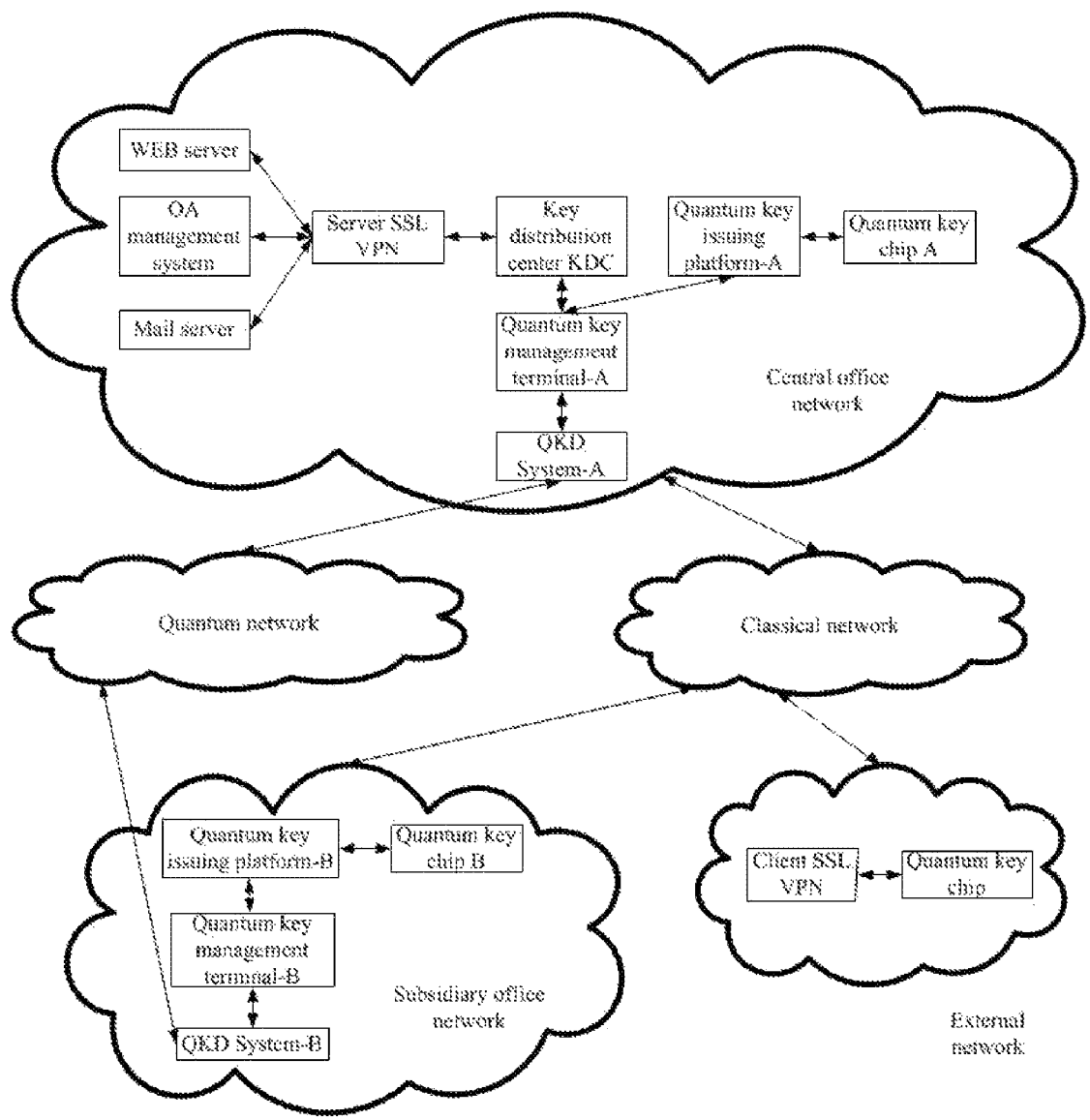
FIG. 10 is a diagram of a typical application scenario according to the present disclosure.

Hereinafter a specific application scenario for all the above embodiments of the present disclosure is introduced in conjunction with FIG. 10.

Application servers are concentrated in a central office. The KDC is also deployed in the central office. The quantum key may be generated between the central office and a subsidiary office by using the quantum network. In a case that the quantum key chip is issued by using the quantum key issuing platform, one copy of the quantum key is stored in the quantum key chip, and an identical copy is stored and managed by the KDC. A user in the public network can use the quantum key chip to access the server SSL VPN at the central office through the client SSL VPN, and further access the application servers.

The quantum key chip carrying the quantum key is convenient to carry and easy to use, and is well combined with SSL VPN, which is with a point-to-terminal access manner. Convenience of applying the quantum key is improved at the mobile device side. Further, the ID of the quantum key chip is bound to the ID of the user in the one-to-one correspondence, increasing an ID level of the user. The quantum key is safely stored in the quantum key chip, and the data can be encrypted and decrypted within the chip, improving a security level of the system as a whole. Moreover, the client SSL VPN and the quantum key chip are organically combined to support the original negotiation process, and also support access via the quantum key chip as an extension. Compatibility and adaptability of the system are maintained.

The foregoing embodiments are only preferred embodiments of the present disclosure, and do not limit the present disclosure in any form. The preferred embodiments according to the disclosure are disclosed above, and are not intended to limit the present disclosure. With the method and technical content disclosed above, those skilled in the art can make some variations and improvements to the technical solutions of the present disclosure, or make some equivalent variations on the embodiments without departing from the scope of technical solutions of the present disclosure. All simple modifications, equivalent variations and improvements made based on the technical essence of the present disclosure without departing the content of the technical solutions of the present disclosure fall within the protection scope of the technical solutions of the present disclosure.

The invention claimed is:

1. A method for applying a quantum key chip, applied to a communication system of a secure socket layer virtual private network SSL VPN, wherein:

the system comprises a client SSL VPN, a server SSL VPN, a key distribution center (KDC), and a quantum key chip; and in a case that negotiation on a quantum key performed by the client SSL VPN and the server SSL VPN is normal, the method comprises:
  acquiring, by the client SSL VPN, a first random number from the quantum key chip;
  sending, by the client SSL VPN, the first random number to the server SSL VPN;
  receiving, by the client SSL VPN, a second random number sent by the server SSL VPN;
  determining, by the client SSL VPN and the server SSL VPN in the negotiation, that the quantum key in the quantum key chip serves as a pre-master key;
  sending, by the client SSL VPN, an index of the quantum key serving as the pre-master key in the quantum key chip and identification information of the quantum key to the server SSL VPN, so that the server SSL VPN acquires the quantum key from the KDC as the pre-master key by using the index of the quantum key and the identification information of the quantum key, wherein an ID of the quantum key chip and/or an ID of a user serve as the identification information of the quantum key in the quantum key chip, and the identification information is bound with the quantum key corresponding to the identification information by the KDC in advance; and
  acquiring, by the client SSL VPN and the server SSL VPN, a session key based on the first random number, the second random number and the quantum key serving as the pre-master key through a predetermined algorithm.

2. The method for applying the quantum key chip according to claim 1, wherein acquiring, by the client SSL VPN, the session key based on the first random number, the second random number and the quantum key serving as the pre-master key through the predetermined algorithm comprises:
  acquiring, by the client SSL VPN, the quantum key serving as the pre-master key from the quantum key chip, and acquiring, by the client SSL VPN, the session key based on the first random number, the second random number, and the quantum key serving as the pre-master key through the predetermined algorithm; or
  informing, by the client SSL VPN, the quantum key chip of the second random number and the predetermined algorithm, and receiving, by the client SSL VPN, the session key returned by the quantum key chip, wherein the session key is calculated by the quantum key chip based on the quantum key serving as the pre-master key, the first random number, and the second random number through the predetermined algorithm.

3. The method for applying the quantum key chip according to claim 1, wherein in a case that negotiation on a quantum key performed by the client SSL VPN and the server SSL VPN is abnormal, the method comprises:
  sending, by the client SSL VPN, a generated first random number to the server SSL VPN, and receiving, by the client SSL VPN, a second random number sent by the server SSL VPN;
  performing, by the client SSL VPN and the server SSL VPN, negotiation on a pre-master key; and
  acquiring, by the client SSL VPN and the server SSL VPN, a session key based on the first random number, the second random number, and the pre-master key through a predetermined algorithm.

4. The method for applying the quantum key chip according to claim 1, wherein the method further comprises:
  encrypting and/or decrypting, by the client SSL VPN or the quantum key chip, application data via the session key.

5. A system for applying a quantum key, comprising a quantum key chip, a client SSL VPN, a server SSL VPN, and a key distribution center (KDC), wherein:
  the client SSL VPN is configured to, in case of determining that negotiation on the quantum key performed with the server SSL VPN is normal:
    acquire a first random number from the quantum key chip,
    send the first random number to the server SSL VPN,
    receive a second random number sent by the server SSL VPN,
    determine, in the negotiation with the server SSL VPN, that the quantum key in the quantum key chip serves as a pre-master key, and
    send an index of the quantum key serving as the pre-master key in the quantum key chip and identification information of the quantum key to the server SSL VPN;
  the quantum key chip is configured to generate the first random number;
  the server SSL VPN is configured to acquire the quantum key from the KDC as the pre-master key by using the index of the quantum key and the identification information of the quantum key;
  the KDC is configured to bind the identification information with the quantum key corresponding to the identification information in advance, wherein an ID of the quantum key chip and/or an ID of a user serve as the identification information of the quantum key in the quantum key chip; and
  the client SSL VPN and the server SSL VPN are further configured to acquire a session key based on the first random number, the second random number and the quantum key serving as the pre-master key through a predetermined algorithm.

6. The system for applying the quantum key according to claim 5, wherein the client SSL VPN is configured to acquire the session key based on the first random number, the second random number and the quantum key serving as the pre-master key through the predetermined algorithm; and wherein:
  the client SSL VPN is configured to acquire the quantum key from the quantum key chip as the pre-master key, and acquire the session key based on the first random number, the second random number and the quantum key serving as the pre-master key through the predetermined algorithm; or
  the client SSL VPN is configured to inform the quantum key chip of the second random number and the predetermined algorithm; the quantum key chip is configured to calculate the session key by using the quantum key serving as the pre-master key, the first random number, the second random number, and the predetermined algorithm; and send the session key to the client SSL VPN.

7. The system for applying the quantum key according to claim 5, wherein:
  the client SSL VPN is further configured to send a generated first random number to the server SSL VPN, in case of determining that the negotiation on the quantum key performed by the client SSL VPN and the server SSL VPN is abnormal;

the server SSL VPN is configured to send the generated second random number to the client SSL VPN;

the client SSL VPN and the server SSL VPN are further configured to perform negotiation on a pre-master key; and the client SSL VPN and the server SSL VPN are further configured to acquire a session key based on the first random number, the second random number, and the pre-master key through a predetermined algorithm.

8. The system for applying the quantum key according to claim 5, wherein:

the client SSL VPN is further configured to encrypt and/or decrypt application data via the session key, or the quantum key chip is further configured to encrypt and/or decrypt application data via the session key.

9. The method for applying the quantum key chip according to claim 2, wherein in a case that negotiation on a quantum key performed by the client SSL VPN and the server SSL VPN is abnormal, the method comprises:

sending, by the client SSL VPN, a generated first random number to the server SSL VPN, and receiving, by the client SSL VPN, a second random number sent by the server SSL VPN;

performing, by the client SSL VPN and the server SSL VPN, negotiation on a pre-master key; and acquiring, by the client SSL VPN and the server SSL VPN, a session key based on the first random number, the second random number, and the pre-master key through a predetermined algorithm.

10. The system for applying the quantum key according to claim 6, wherein:

the client SSL VPN is further configured to send a generated first random number to the server SSL VPN, in case of determining that the negotiation on the quantum key performed by the client SSL VPN and the server SSL VPN is abnormal;

the server SSL VPN is configured to send the generated second random number to the client SSL VPN;

the client SSL VPN and the server SSL VPN are further configured to perform negotiation on a pre-master key; and the client SSL VPN and the server SSL VPN are further configured to acquire a session key based on the first random number, the second random number, and the pre-master key through a predetermined algorithm.

* * * * *